UNITED STATES PATENT OFFICE.

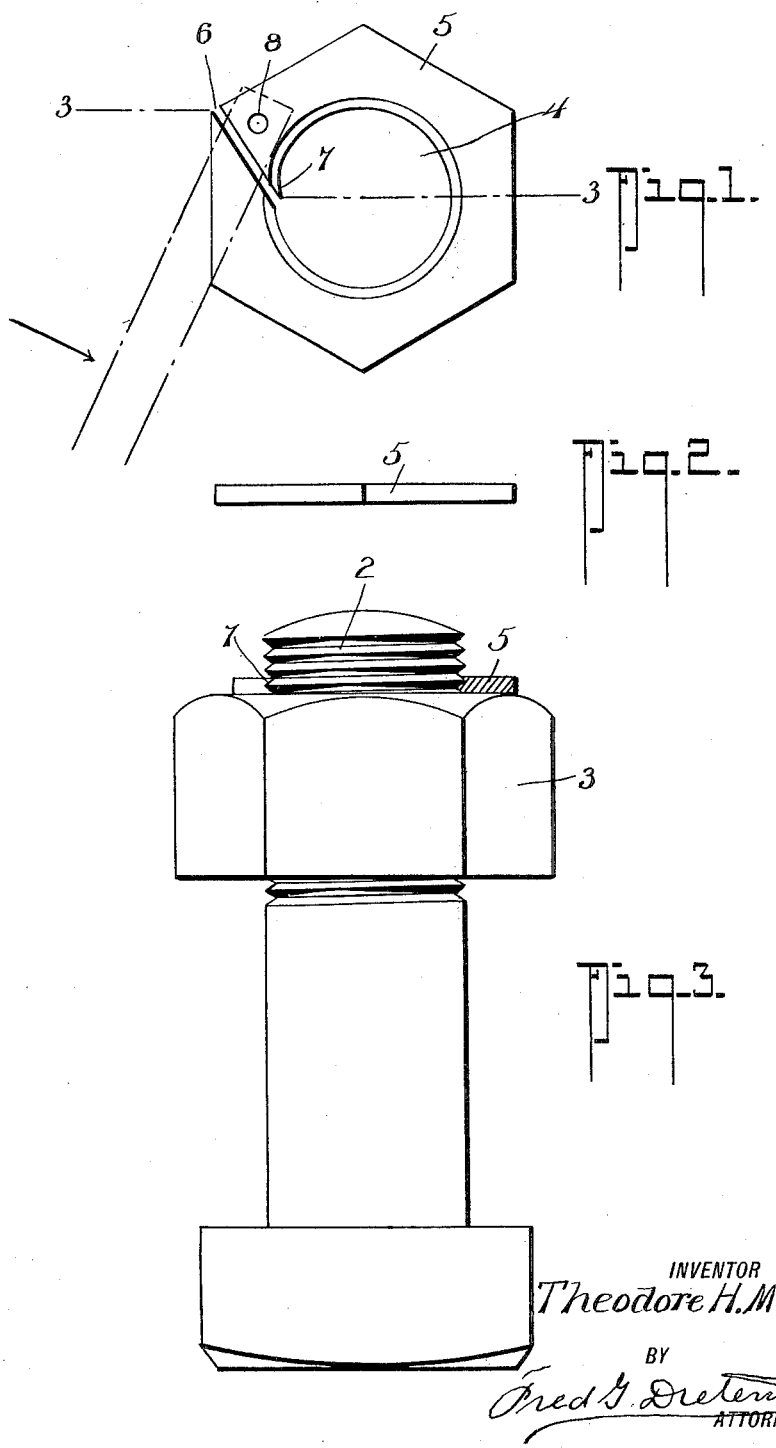

THEODORE H. McCAIN, OF GIBSON'S LANDING, BRITISH COLUMBIA, CANADA.

LOCK-WASHER.

1,228,334.  Specification of Letters Patent.  Patented May 29, 1917.

Application filed August 18, 1916. Serial No. 115,616.

*To all whom it may concern:*

Be it known that I, THEODORE H. McCAIN, a citizen of the United States, residing at Gibson's Landing, in the Province of British Columbia, Canada, have invented certain new and useful Improvements in Lock-Washers, of which the following is a specification.

This invention relates to an improved lock washer for securing a nut on a threaded bolt.

The invention is particularly described in the following specification, reference being made to the drawings by which it is accompanied, in which:

Figures 1 and 2 show the washer in plan and elevation, and

Fig. 3 is a section of the lock washer on the line 3—3 in Fig. 1 showing it as applied to the threaded end of a bolt.

In these drawings 2 represents the threaded end of a bolt and 3 the nut which it is required to lock thereon. The lock washer 5, which is the particular subject of this application, is applied outside the nut. It is made of thin sheet steel and may be tempered to preserve a cutting edge and to afford a sufficient measure of resilience. It is apertured at 4 to fit the bottom of the thread of the bolt and its inner edge is shaped to conform to the V of the thread.

The outer conformation of this washer 5 may be either a hexagon or square to afford facility for turning with a wrench, and the washer is angularly slit at 6 outward and backward from the inner circle 4, the acute point 7 so formed being turned inward slightly within the circle of the aperture 4, so that it will secure a cutting hold of the thread when rotated backward on it.

This cutting hold is exercised not only by virtue of the angle of the inwardly projecting acute point 7 but also by the resilience of the washer resisting its flexure from the flat to conform to the angle of the thread with which its inner edge is in engagement. The washer may thus be freely turned in one direction to close it on the nut which it is designed to secure but will resist rotation in the opposite direction, for the reasons assigned, without cutting into the thread.

To release the washer means may be provided whereby the inwardly projecting point 7 may be withdrawn from engagement with the thread. The particular means by which this may be effected is not material to this application, but an aperture 8 may be provided in the washer adjacent the point 7 and a light wrench having a downwardly projecting pin may be applied, as shown by dot and dash lines in Fig. 1, which wrench, when fulcrumed on the adjacent side of the bolt thread, will rotate the washer backward and will simultaneously spring the point 7 from its retaining engagement with the thread.

The washer is simple and inexpensive and forms an effective lock to secure the nut.

Having now particularly described my invention, I hereby declare that what I claim as new and desire to be protected in by Letters Patent, is:

1. A lock washer of thin flat steel or the like apertured to fit the bolt, said washer slit angularly outward from the aperture, and the acute angle so formed adjacent the aperture, turned slightly inward within the circle of the bolt aperture.

2. A lock washer of thin flat steel or the like apertured to correspond with the bottom of the bolt thread, the edge of which aperture is formed to fit the thread, said washer slit angularly outward from the aperture, and the acute point so formed adjacent the aperture turned slightly inward within the circle of the bolt aperture.

3. A lock washer of thin flat steel, apertured to snugly fit the bolt, said washer being slit angularly outward from the aperture and the acute angle so formed adjacent to the aperture being turned slightly inward within the circle of the bolt aperture, said washer having a tool receiving hole at the side of the slit having the inturned portion, substantially as shown and for the purposes described.

In testimony whereof I affix my signature.

THEODORE H. McCAIN.

Copies of this patent may be obtained for five cents each, by addressing the "Commissioner of Patents, Washington, D. C."